United States Patent
Conley

[11] Patent Number: 5,862,892
[45] Date of Patent: Jan. 26, 1999

[54] COMPOSITE ROTOR FOR CALIPER DISC BRAKES

[75] Inventor: Gary D. Conley, New Boston, Mich.

[73] Assignee: Hayes Lemmerz International Inc., Romulus, Mich.

[21] Appl. No.: 984,677

[22] Filed: Dec. 3, 1997

Related U.S. Application Data

[63] Continuation-in-part of Ser. No. 639,037, Apr. 16, 1996, abandoned.

[51] Int. Cl.$^6$ ........................................... F16D 65/10
[52] U.S. Cl. .................. 188/218 XL; 164/98; 29/527.5; 29/530
[58] Field of Search ................. 29/527.5, 527.6, 29/530, 897.2; 188/218 XL, 18 A; 164/98

[56] References Cited

U.S. PATENT DOCUMENTS 5,509,510    4/1996   Ihm ................................. 188/218 XL

*Primary Examiner*—David P. Bryant
*Attorney, Agent, or Firm*—Marshall & Melhorn

[57] ABSTRACT

A composite rotor for caliper disc brakes and the like includes an outer friction portion having two ring sections, with a plurality of supports extending therebetween to fixedly interconnect the ring sections in a mutually parallel, spaced apart relationship defining a cavity therebetween. The ring sections have opposite friction surfaces which interface with associated friction members. The rotor also includes an inner hub portion having a central mounting section which mounts the same on a drive member, and a peripheral section cast into the cavity of the outer friction portion to integrally interconnect the inner hub and outer friction portions of the rotor with primarily mechanical bonds formed at an unfused interface.

7 Claims, 2 Drawing Sheets

COMPOSITE ROTOR FOR CALIPER DISC BRAKES

CROSS REFERENCE TO RELATED APPLICATIONS

This application is a continuation-in-part of application Ser. No. 08/639,037, filed Apr. 16, 1996, now abandoned.

BACKGROUND OF THE INVENTION

The present invention relates to rotors for caliper disc brakes and the like, and in particular to a composite construction therefor.

Rotors are generally well known in the art, and are used extensively in caliper disc brakes, power transmission devices, clutches, and other similar machinery and mechanisms. Brake rotors are typically cast from a ferrous material, such as cast or grey iron, and are then machined in multiple operations to shape the rotor, to form a inner hub portion and friction surfaces. The inner hub portion of the rotor is mounted to a drive member, such as the vehicle axle, and is drivingly connected to the vehicle wheels. The friction surfaces of the rotor typically include oppositely directed friction surfaces which interface with associated brake pads for braking the vehicle. During braking, vibrations are created when the brake pads contact the friction surfaces of the rotor. Some of the vibrations are transmitted to the operator and passengers of the vehicle through the structure of the vehicle. The vibrations at the friction surfaces are transmitted through the rotor to the hub, to the axle and associated vehicle suspension components, and into the interior of the vehicle where they are manifested to the occupants as undesirable noise.

The ability of a brake rotor to quickly transfer and dissipate heat generated during the braking process is a very desirable feature, as excess heat leads to premature brake wear and/or failure. Also, the ability to readily match rotor and brake pad materials for a specific vehicle application is highly beneficial to achieve the desired braking performance at minimum cost. Corrosion is also a problem with cast iron brake rotors, particularly when used with spoked or windowed types of wheels in which rotors are normally visible, such that some rotors are painted or otherwise surface treated, which adds cost to the part. Weight is another drawback associated with most ferrous metal rotors. Cast aluminum rotors are available to reduce the weight and corrosion problems associated with ferrous metal rotors, however, the heat resistance and brake surface toughness of cast aluminum is typically less desirable than that of other types of rotors.

It is known to use composite rotors having combination of separate components including a friction portion and a hub portion, each comprised of different materials to provide a lightweight, corrosion resistant rotor as disclosed in Ihm (U.S. Pat. No. 5,509,510). However, such rotors use a combination of mechanical and metallurgical bonds to secure the rotor components together. The metallurgical bonds formed between the rotor components couples the components for the effective transmission of braking vibrations through the rotor, to the vehicle, creating noise for the people inside. It is desirable to reduce the transmission of vibrations between the composite rotor components to reduce the braking noise.

SUMMARY OF THE INVENTION

One aspect of the present invention is a composite rotor for caliper disc brakes and the like. The composite rotor includes an outer friction portion having two ring sections with a plurality of supports extending therebetween to fixedly interconnect the ring sections in a mutually parallel, spaced apart relationship defining a cavity therebetween. The ring sections have opposite friction surfaces which interface with associated friction members. The ring section is preferably cast iron having a predetermined melting point, although other suitable materials may be used.

The rotor also includes an inner hub portion having a central mounting section which mounts the same on a drive member, and a peripheral section cast into the cavity of the outer friction portion to integrally interconnect the inner hub and outer friction portions of the rotor. The inner hub portion is preferably aluminum having a melting point substantially lower than the ring section material, although other suitable materials having a melting point substantially lower than the ring section material may be used. When the peripheral section is cast into the cavity of the outer friction portion, the liquid material does not melt the ring section material and an unfused interface is formed between the friction portion and the hub portion which reduces the transmission of vibrations therebetween.

Another aspect of the present invention is a method for making composite rotors for caliper disc brakes and the like. The method comprises forming an outer friction portion of the rotor having two ring sections, with a plurality of supports extending therebetween to fixedly interconnect the ring sections in a mutually parallel, spaced apart relationship defining a cavity therebetween. An inner hub portion of the rotor, having a central mounting section for attaching the same to a drive member, is cast in situ into the outer friction portion, such that the outer peripheral section of the inner hub portion is cast directly into the cavity of the outer friction portion to integrally interconnect the inner hub and the outer friction portions by bonds which are substantially mechanical in nature. At least one friction surface is formed on an exterior area of at least one of the two ring sections of the outer friction portion to interface with an associated brake pad or other friction member.

The principal objects of the present invention are to provide a rotor having a composite construction with improved operating characteristics. The composite rotor preferably has an inner hub portion constructed from a material having good heat transfer properties, so as to improve heat dissipation during the braking process. The composite rotor also preferably has an outer friction portion constructed from a material which can be readily matched to a particular brake pad material, so as to maximize braking efficiency at minimum cost. The composite rotor is also relatively lightweight and corrosion-resistant. When used in vehicle brake systems, the composite rotor operates with reduced braking noise. The parts of the composite rotor are integrally interconnected with a mechanical bond for maximum strength, without interfering with the friction surfaces. The composite rotor is also efficient in use, economical to manufacture, capable of a long operating life, and particularly well adapted for the proposed use.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
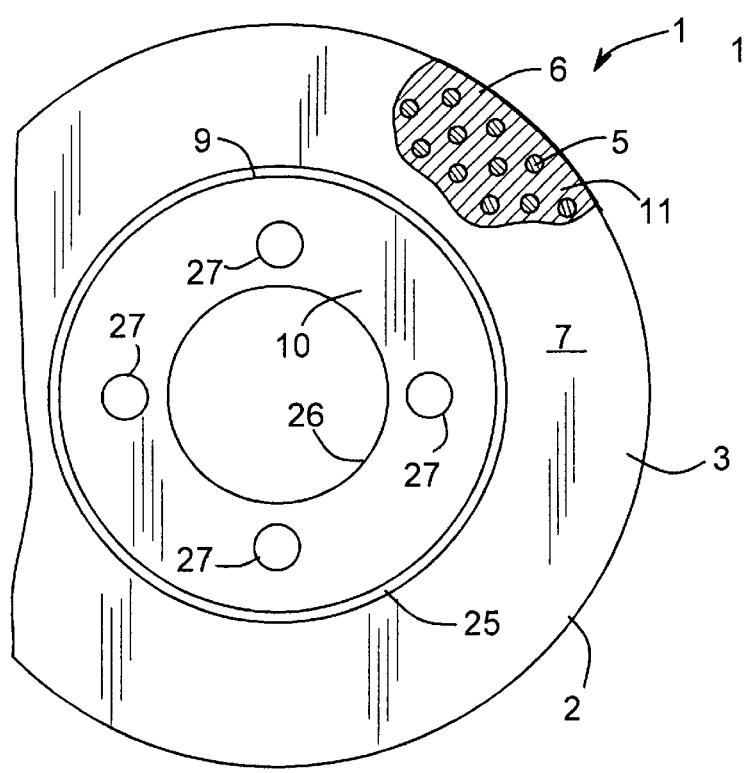
FIG. 1 is a fragmentary, front elevational view of a composite rotor embodying the present invention.
Figure 2:
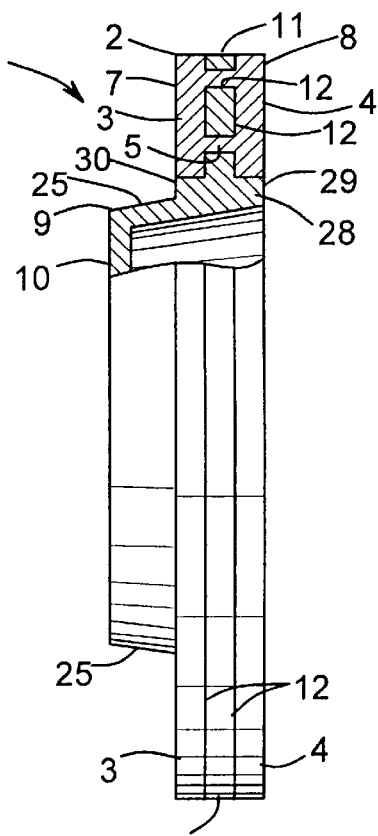
FIG. 2 is a side elevational view of the composite rotor, wherein a portion thereof has been broken away to reveal internal construction.

For purposes of description herein, the terms "upper," "lower," "right," "left," "rear," "front," "vertical," "horizontal," and derivatives thereof shall relate to the invention oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIGS. 1 and 2) generally designates a composite rotor embodying the present invention. Rotor 1 is of the type adapted for use in conjunction with a variety of mechanical devices, such as caliper disc brakes and the like. Rotor 1 includes an outer friction portion 2 having two ring sections 3 and 4, with a plurality of supports 5 extending therebetween to fixedly interconnect ring sections 3 and 4 in a mutually parallel, spaced apart relationship defining a cavity 6 therebetween. Ring sections 3 and 4 have opposite friction surfaces 7 and 8 which interface with associated friction members (not shown), such as brake pads or the like. Rotor 1 also includes an inner hub portion 9 having a central mounting section 10 which mounts the same on an associated drive member (not shown), such as a spindle or vehicle axle, and a peripheral section 11 cast into the cavity 6 of outer friction portion 2 to integrally interconnect the inner hub and outer friction portions 9 and 2 of rotor 1.

Figure 4:
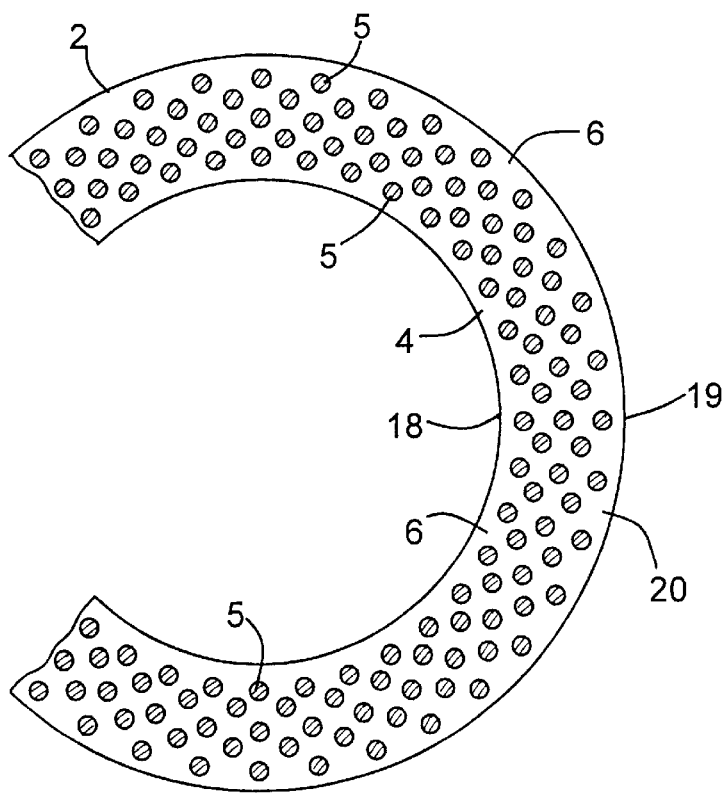
FIG. 4 is a cross-sectional view of an outer friction portion of the composite rotor, taken along the line IV—IV, FIG. 5.
Figure 5:
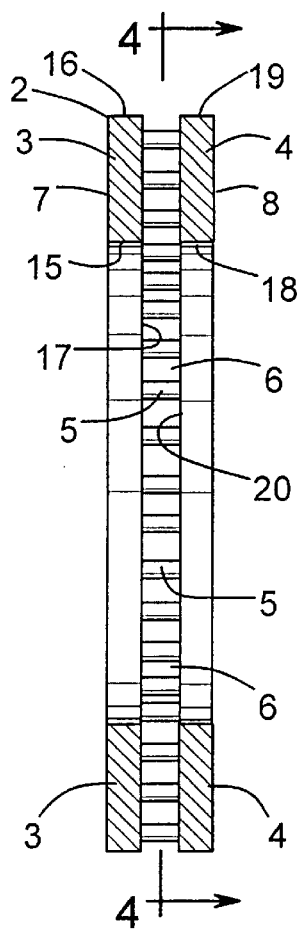
FIG. 5 is a radial, cross-sectional view of the outer friction portion of the composite rotor.

In the illustrated example, the outer friction portion 2 of rotor 1 is in the nature of a core, wherein ring sections 3 and 4 are substantially identical, each having an annular front elevational configuration, and a substantially uniform thickness. More specifically, ring section 3 (FIGS. 4 and 5) has circular radially inner and outer edges 15 and 16, as well as inner and outer faces 17 and 7, respectively. Similarly, ring section 4 includes radially inner and outer edges 18 and 19, and inner and outer faces 20 and 8, respectively. The illustrated supports 5 are in the form of posts that extend generally perpendicularly between ring sections 3 and 4, and have opposite ends thereof fixedly interconnected therewith, so as to securely retain ring sections 3 and 4 in a mutually parallel, spaced apart relationship. As best illustrated in FIGS. 1 and 4, the illustrated posts 5 having generally circular transverse cross-sectional shape, and are arranged between ring sections 3 and 4 in a staggered, circular pattern to provide maximum strength and support. However, it is to be understood that supports 5 may assume a variety of different configurations, such as square, ovate, triangular, tear-drop, fin-shaped, etc., and may be arranged in different patterns between ring sections 3 and 4, as will be apparent to one having ordinary skill in the art. Supports 5 may also comprise radially extending fins or vanes (not shown) which can be either machined or cast into rotor 1. The shape, size and location of supports 5 can be varied to achieve the desired heat dissipation characteristics.

In one working embodiment of the present invention, the outer friction portion or core 2 of rotor 1 has a one-piece, cast construction, preferably constructed from grey or cast iron having a melting temperature of approximately 2150° F. The melting temperature may vary depending on the constituents of the iron. The friction surfaces 7 and 8 of rotor 1 can be readily machined on the opposite faces of ring sections 3 and 4, and will have sufficient toughness that they can be used effectively in conjunction with a wide variety of different types of brake pad materials. Other suitable materials, including cast iron of different grades, may be used for the outer friction portion 2. Alternatively, the outer friction portion 2 may be comprised of separate portions fastened together in a known manner, or it may be formed by machining or other metal working techniques in a known manner.

Figure 3:
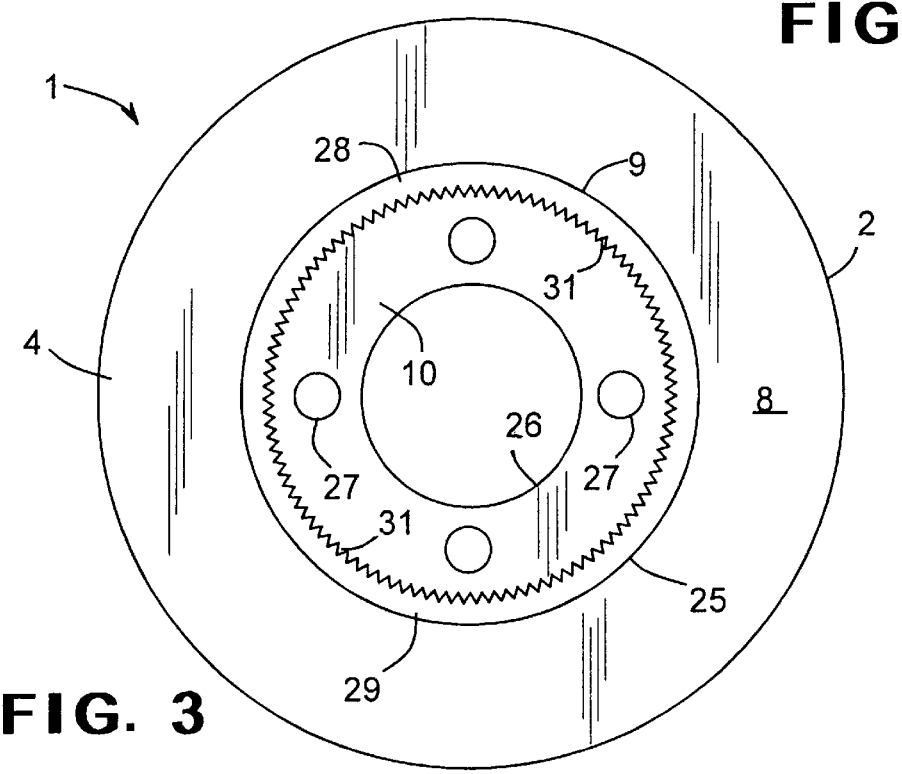
FIG. 3 is a rear elevational view of the composite rotor.

The illustrated inner hub portion 9 (FIGS. 1–3) of rotor 1 has a generally hat-shaped side elevational configuration, wherein the central mounting section 10 is offset laterally from peripheral section 11 by a shoulder section 25. The central mounting section 10 of the inner hub portion 9 of rotor 1 has a central pilot aperture 26 in which a spindle hub or the like is closely received, and a plurality of circumferentially spaced apart fastener apertures 27 in which fasteners are received to mount rotor 1 on an associated drive mechanism. In the illustrated example, the central and peripheral sections 10 and 11 of inner hub portion 9 are substantially planar, and have a generally uniform thickness, while the shoulder portion 25 is slightly tapered. The radially inward area, or base 28 of peripheral section 11, is integral with shoulder section 25, and includes side edges 29 and 30 which are positioned flush with the friction surfaces 7 and 8 of outer friction portion 2. As best illustrated in FIG. 3, the inboard portion of base 28 may include teeth 31, such as those used in conjunction with sensor devices for automatic braking systems ("ABS").

It is to be understood that the inner hub portion 9 of rotor 1 may have alternative shapes and/or designs. For example, the central mounting section 10 may be flat, the shoulder portion 25 may be straight, and side edges 29 and 30 may be offset. All such variants are to be considered as examples of the present invention, unless the claims expressly state otherwise.

In one working embodiment of the present invention, the inner hub portion 9 of rotor 1 has a one-piece, cast construction, made from cast aluminum having a melting temperature of approximately 1200° F which is substantially lower than the melting temperature of the outer friction portion 2. As described in greater detail hereinafter, the peripheral section 11 of inner hub portion 9 may be cast in situ, or directly into the cavity 6 of outer friction portion 2 to integrally interconnect the inner hub 9 and outer friction portions 2. The term "in situ", as used herein, means casting directly into a preformed core 2. During the casting in situ, the substantially higher melting temperature of the outer friction portion 2 substantially prevents the ring section inner faces 17 and 20 and posts 5 from melting during contact with the molten peripheral section material.

When the peripheral section material solidifies, an unfused interface 12 is formed between the ring section inner faces 17 and 20, the surfaces of the posts 5 and the surface of the peripheral section 11. The peripheral section 11 adheres to the friction portion 2 at the unfused interface 12 primarily with mechanical bonds between interlocking particles of the ring section inner faces 17 and 20, the surfaces of the posts 5 and the surface of the peripheral section 11. Few if any metallurgical bonds are created because the outer friction portion does not melt and intermix with the molten peripheral section material. Alternatively, the inner hub portion 9 may be constructed of other suitable materials, as long as the melting temperature of the inner hub portion 9 is substantially lower than the melting temperature of the outer friction portion 2. A substantially lower melting temperature is defined as a melting temperature in which the molten inner hub material melts little or none of the outer friction portion 2 during the casting so as to create an unfused interface therebetween having bonds which are primarily mechanical in nature.

The unfused interface 12 containing primarily mechanical bonds partially decouples the joined surfaces and reduces the transmission of vibrations therebetween more effectively than an interface containing mechanical and metallurgical bonds. By reducing the transmission of vibrations through the rotor, from the friction portion to the hub portion 9, the noise reaching the occupants is reduced.

The aluminum material at the peripheral section 11 of inner hub portion 9 provides good heat transmission and dissipation during the braking process. The aluminum material associated with inner hub portion 9 also provides good corrosion resistance, as well as reduced weight.

While the illustrated rotor 1 has a bi-metal construction of cast iron and aluminum, it is to be understood that the present invention also contemplates constructing the outer friction portion 2 and inner hub portion 9 of rotor 1 from a wide variety of different materials. Both ferrous and/or aluminum alloys may be used, as well as appropriate synthetic materials. The melting point of the In this manner, the characteristics of the friction surfaces 7 and 8 of rotor 1 can be matched closely with a specified brake material. Also, the desired strength and heat transmission of inner hub portion 9 can be selected for any given braking system, so as to maximize braking efficiency, yet minimize cost.

Figure 6:
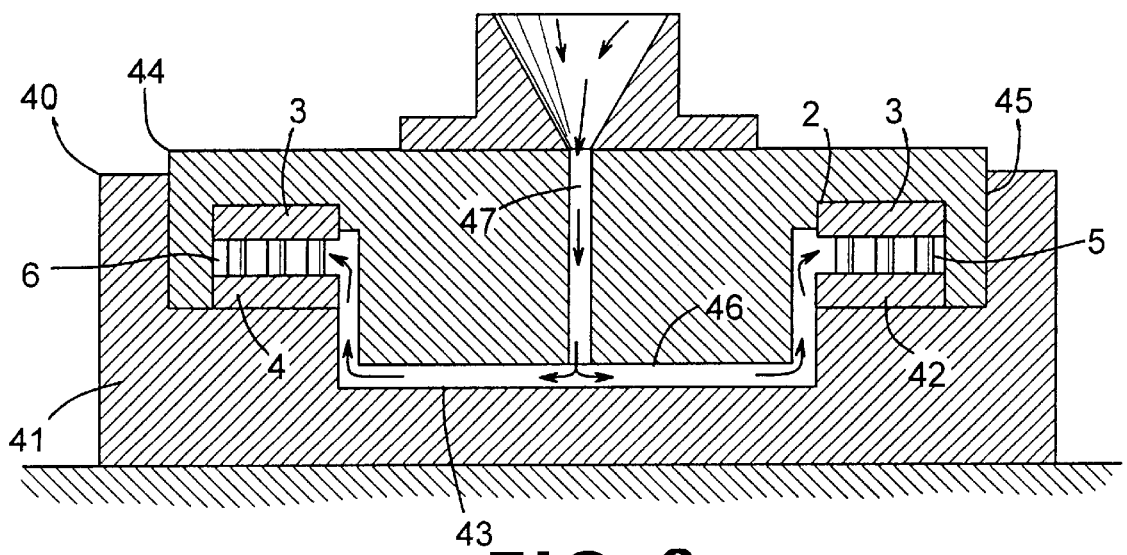
FIG. 6 is a partially schematic, cross-sectional view of a mold for casting the inner hub portion of the composite rotor into the outer friction portion thereof.

With reference to FIG. 6, composite rotor 1 may be made in the following manner. A casting die 40 is provided having a base at 41 with a recessed ledge 42 shaped to receive the outer friction member or core 2 of rotor 1 in the manner illustrated in FIG. 6. Die base 41 has a lower surface 43 shaped similar to the exterior surface of the central mounting member 10 of rotor 1. Casting die 40 also includes a cap 44 with a peripheral ring 45 which extends between the outer edges 16 and 19 of ring sections 3 and 4, and forms a seal therebetween. Die cap 44 also includes a protruding central portion 46 which is shaped similar to the interior surface of the central mounting member 10 of rotor 1. A sprue 47 is provided in die cap 44, and directs molten aluminum, or other selected fluidized materials, therethrough into the die space in which inner hub portion 9 is formed, and outwardly into the cavity 6 of outer friction member 2. In the illustrated example, the molten aluminum completely fills cavity 6, and surrounds each of the posts 5 and mechanically bonds the two rotor portions 2 and 9 together, without separate fasteners or the like. However, it may be desirable to not completely fill the cavity 6 to create some gaps between the rotor portions 2 and 9 to further reduce the transmission of vibrations between the rotor portions. The friction surfaces 7 and 8 of rotor 1 are thereby full, and without interference or interruptions, so as to maximize braking effectiveness and efficiency. Preferably, the ABS teeth 31 are formed integrally in the casting to minimize machining operations. After the casting has cooled, the die cap 44 is removed, and the composite rotor 1 is removed from the casting die 40. The friction surfaces 7 and 8 of the outer friction member 2 may then be machined, if necessary to mate with a specified brake pad material.

The composite construction of rotor 1 provides improved operating characteristics, which include better heat transmission and dissipation through the use of aluminum in inner hub 9, along with lighter weight, and corrosion resistance. The cast iron construction of outer friction member 2 adapts rotor 1 for use in conjunction with a wide variety of currently available brake pad materials. When used in vehicle brake systems, rotor 1 has reduced braking noise. The two portions 2 and 9 of rotor 1 are integrally and securely interconnected without disruption of friction surfaces 7 and 8, and final machining operations are minimized to reduce manufacturing cost.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A composite rotor for caliper disc brakes and the like, comprising:

a friction portion having first and second ring sections and a plurality of supports extending therebetween to fixedly interconnect said ring sections in a mutually parallel, spaced apart relationship defining a cavity therebetween, said first and second ring sections having first and second oppositely oriented outer friction surfaces adapted to interface with associated friction members; and a hub portion having a central mounting section adapted for attaching said rotor to an associated drive member, and a peripheral section cast into the cavity of said friction portion to interconnect said friction portion to said hub portion with bonds which are substantially only mechanical bonds, said hub portion being formed from a material having a predetermined melting temperature substantially lower than the melting temperature of said friction portion to inhibit metallurgical bonding between said hub portion and said friction portion for reducing the transmission of vibrations therebetween.

2. A composite rotor as set forth in claim 1, wherein: said hub portion is constructed from cast aluminum.

3. A composite rotor as set forth in claim 2, wherein: said friction portion is constructed from cast iron.

4. A composite rotor for caliper disc brakes and the like, comprising:

a friction portion formed from a material having a predetermined melting temperature and including first and second ring sections and a plurality of supports extending therebetween to fixedly interconnect said ring sections in a mutually parallel, spaced apart relationship defining a cavity therebetween, said first and second ring sections having respective first and second oppositely oriented outer friction surfaces adapted to interface with associated friction members; and a hub portion having a central mounting section adapted for attaching said rotor to an associated drive member, and a peripheral section cast into the cavity of said friction portion for interconnecting said friction portion to said hub portion, said hub portion formed from a material having a predetermined melting temperature substantially lower than the melting temperature of said friction portion such that substantially all of the interface between said friction portion and said hub portion is unfused for reducing the transmission of vibrations therebetween.

5. A composite rotor as set forth in claim 4, wherein:

said hub portion is constructed from cast aluminum.

6. A composite rotor as set forth in claim 5, wherein:

said outer friction portion is constructed from cast iron.

7. A composite rotor for caliper disc brakes and the like, comprising:

a friction portion constructed from cast iron having a predetermined melting temperature and including first and second ring sections and a plurality of supports extending between said rings section to fixedly interconnect said ring sections in a mutually parallel, spaced apart relationship defining a cavity therebetween, wherein said first and second outer surfaces form oppositely oriented friction surfaces adapted to interface with associated friction members; and a hub portion having a central mounting section adapted for attaching said rotor to an associated drive member and a peripheral section cast into the cavity of said friction portion for interconnecting said friction portion to said hub portion, said hub portion being constructed from cast aluminum having a predetermined melting temperature substantially lower than the melting temperature of said friction portion such that an unfused interface for reducing the transmission of vibrations is created between said peripheral section and said friction portion.

\* \* \* \* \*